(12) United States Patent
Nakagawa

(10) Patent No.: US 8,321,602 B2
(45) Date of Patent: Nov. 27, 2012

(54) DEVICE MANAGEMENT APPARATUS, DEVICE MANAGEMENT METHOD AND DEVICE MANAGEMENT PROGRAM

(75) Inventor: Shinya Nakagawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 172 days.

(21) Appl. No.: 12/551,124

(22) Filed: Aug. 31, 2009

(65) Prior Publication Data

US 2010/0057947 A1 Mar. 4, 2010

(30) Foreign Application Priority Data

Sep. 3, 2008 (JP) .................................. 2008-225816

(51) Int. Cl.
*G06F 3/00* (2006.01)
*G06F 13/12* (2006.01)
(52) U.S. Cl. ................ 710/16; 710/15; 710/19; 710/62; 709/223; 709/229; 700/108
(58) Field of Classification Search .................. 710/16
See application file for complete search history.

(56) References Cited

U.S. PATENT DOCUMENTS 5,828,888 A * 10/1998 Kozaki et al. ................. 717/170
6,668,319 B1 * 12/2003 Newell et al. ................ 713/100
2004/0230377 A1 * 11/2004 Ghosh et al. ...................... 702/3
2007/0220131 A1 * 9/2007 Ozawa et al. ................. 709/223
2008/0112388 A1 5/2008 Garrett et al.
2009/0049207 A1 * 2/2009 Reynolds et al. ............... 710/16
2009/0292995 A1 * 11/2009 Anne et al. ..................... 715/736

FOREIGN PATENT DOCUMENTS

DE 102066062478 A1 7/2008

OTHER PUBLICATIONS

Hideyuki Sakamoto, "FDT/DTM Lifecyele Management of Field Devices," Jul. 2006, pp. 26-29.
Isao Hirooka, et al., "FieldMate Field Device Management Tool for the New Era," Yokogawa Technical Report English Edition, 2007, pp. 9-12. No. 44.
European Search Report dated Aug. 18, 2011 for EP 09 168984.4.
Omron: "CX-Profibus Ver. 1.0 Operation Manual", Jul. 5, 2005.

* cited by examiner

*Primary Examiner* — Henry Tsai
*Assistant Examiner* — Dean Phan
(74) *Attorney, Agent, or Firm* — Sughrue Mion, PLLC

(57) ABSTRACT

A device management apparatus may include, but is not limited to, a device controller that controls a device, a communication controller, a management unit, and a monitoring unit. The communication controller controls a communication between the device and the device controller. The management unit manages the device controller and the communication controller. The monitoring unit is disposed between the device controller and the communication controller. The monitoring unit formats data that is transmitted between the device controller and the communication controller so as to create formatted data. The monitoring unit supplies the formatted data to the management unit.

2 Claims, 6 Drawing Sheets

DEVICE MANAGEMENT APPARATUS, DEVICE MANAGEMENT METHOD AND DEVICE MANAGEMENT PROGRAM

BACKGROUND OF THE INVENTION

1. Field of the Invention

The present invention generally relates to a device management apparatus that controls various devices such as field devices, a device management method and a device management program.

Priority is claimed on Japanese Patent Application No. 2008-225816, filed Sep. 3, 2008, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Recently, a plant has been scaled up and integrated so as to improve productivity and production efficiency. In general, operations in the plant are held in a highly automated manner using a Distributed Control System, hereinafter referred to as a DCS. Along with the automation, various intelligent devices such as field devices are introduced in the plant. The field devices are made by various makers and often have different specifications. As a result, it is difficult to manage the field devices.

Recently, the management of the field devices is held by using a device management apparatus that is designed using a technology of a Field Device Tool, hereinafter referred to as a FDT, and a Device Type Manager, hereinafter referred to as a DTM, to overcome the different specifications of the field devices. As a result, the field devices are managed in a unified manner.

The FDT is an open interface specification that performs a data exchange between the device management apparatus and the field devices. The data exchange is independent of the type of a communication bus or a communication protocol. The DTM is an application performing a communication, a setting, a diagnosis, etc. of the field devices.

FIG. 6 is a block diagram illustrating a main configuration of the conventional device management apparatus. The conventional device management apparatus 100 includes an FDT frame application 110, device DTMs 121, 122, 123, - - -, and a communication DTM 130. The communication DTM 130 is connected to field devices 201, 202, 203, - - - through a bus B100. The conventional device management apparatus 100 controls the field devices 201, 202, 203, - - - -. Each of the device DTMs 121, 122, 123, - - - corresponds to a respective one of the field devices 201, 202, 203, - - - -. The conventional device management apparatus 100 is realized by installing a program to a computer such as a personal computer. The FDT frame application 110, the device DTMs 121, 122, 123, - - -, and the communication DTM 130 are realized by loading and executing the program that is made based on the FDT specification.

The FDT frame application 110 controls the device DTMs 121, 122, 123, - - - and the communication DTM 130. The FDT frame application 110 links the device DTMs 121, 122, 123, - - - to the communication DTM 130. The FDT frame application 110 provides an interface that enables a user to operate the device DTMs 121, 122, 123, - - - and the communication DTM 130. Each of the field devices 201, 202, 203, - - - has a respective function. Each of the device DTMs 121, 122, 123, - - - controls the respective one of the field devices 201, 202, 203, - - - -, and performs the respective function of the respective one of the field devices 201, 202, 203, - - - -. Each of the device DTMs 121, 122, 123, - - - has a user interface that displays parameters of the respective one of the field devices 201, 202, 203, - - - -. The display of the parameters is performed based on information from the communication DTM 130. The display of the parameters is performed in a format that is easy for the user to recognize.

The communication DTM 130 is disposed between the device DTMs 121, 122, 123, - - - and the field devices 201, 202, 203, - - -, and is connected to the field devices 201, 202, 203, - - - through the bus B100. The communication DTM 130 performs transmission of various information between the device DTMs 121, 122, 123, - - - and the field devices 201, 202, 203, - - - through the bus B100. The communication DTM 130 controls the bus B100. The communication DTM 130 receives information from the bus B100 that includes information from the field devices 201, 202, 203, - - -, and performs formatting of the received information based on the FDT specification. The formatted information includes device information of the field devices 201, 202, 203, - - - -. The communication DTM 130 outputs the formatted information to the field device DTMs 121, 122, 123, - - - -. The communication DTM 130 receives information from each of the device DTMs 121, 122, 123, - - -, and performs setting of the respective field devices 201, 202, 203, - - - based on the respective received information. The FDT frame application 110, the device DTMs 121, 122, 123, - - -, and the communication DTM 130 are made by various makers.

In the above mentioned configuration, when the user instructs the FDT frame application 110 to operate the field device 201, such as, to collect parameters of the field device 201, information of the instruction is output from the FDT frame application 110 to the device DTM 121. The device DTM 121 receives the information of the instruction, and outputs the received information to the communication DTM 130. The communication DTM 130 receives the information, and outputs the received information to the field device 201 through the bus B100. Then collection of parameters of the field device 201 is performed in the field device 201. The collected parameters are transmitted from the filed device 201 to the device DTM 121 through the bus B100 and the communication DTM 130. The collected parameters are displayed on the user interface of the device DTM 121 in the format that is easy for the user to recognize.

Details of the above mentioned device management apparatus 100 is mentioned in the following nonpatent literatures.
[Nonpatent literature 1]
Hideyuki Sakamoto, FDT/DTM Lifecycle Management of Field Devices, Instrumentation and Automation, July, 2006, pp. 26-29.
[Nonpatent literature 2]
Isao Hirooka et al., FieldMate Field Device Management Tool for New Era, Yokogawa Technical Report English Edition, No. 44, 2007, pp. 9-12.

Recently, in the field of the device management apparatus that performs management of the field devices, there is an idea to store the operation history of the field devices 201, 202, 203, - - - and to use the stored operation history for maintenance from a standpoint of asset management. In a general specification of the FDT, there is a scheme to store the operation history, so the above mentioned idea is thought to be achieved by using the scheme. But an implementation of the scheme to store the operation history is not essential but optional in the FDT specification, and the operation history of the field devices 201, 202, 203, - - - is not necessarily given.

Even if the scheme to store the operation history is implemented, data collect target, data collect frequency, data format, etc. vary from DTM to DTM such as the device DTMs 121, 122, 123, - - - and the communication DTM 130. In order to get a useful information from the collected data, enormous effort such as data shaping is needed. It is difficult to get a useful operation history for maintenance when various kind of DTMs such as the device DTMs 121, 122, 123, - - - and the communication DTM 130 are mixed.

In view of the above, it will be apparent to those skilled in the art from this disclosure that there exists a need for an improved method to collect an operation history from various devices. This invention addresses this need in the art as well as other needs, which will become apparent to those skilled in the art from this disclosure.

SUMMARY OF THE INVENTION

In one aspect of the present invention, a device management apparatus may include, but is not limited to, a device controller that controls a device, a communication controller, a management unit, and a monitoring unit. The communication controller controls a communication between the device and the device controller. The management unit manages the device controller and the communication controller. The monitoring unit is disposed between the device controller and the communication controller. The monitoring unit formats data that is transmitted between the device controller and the communication controller so as to create formatted data. The monitoring unit supplies the formatted data to the management unit.

The monitoring unit may store first property information of the device controller and second property information of the communication controller. The monitoring unit may include, but is not limited to, a reporting unit. The reporting unit reports the first property information when receiving a first query from the communication controller. The reporting unit reports the second property information when receiving a second query from the device controller.

The monitoring unit may further include, but is not limited to, a receiving unit and a storing unit. The receiving unit may temporary receive the data that is to be transmitted between the device controller and the communication controller. The storing unit may store data received by the receiving unit.

The monitoring unit may further include a processor. The processor performs a selection process of selecting data stored in the storing unit to create selected data. The selection process is performed based on information of collecting condition that is used to decide at least one of data sets to be collected and a cycle of the collecting.

The processor may perform a conversion process of converting the selected data. The conversion process is performed based on information of a reporting format that regulates a format in transmitting the data to the management unit.

In a second aspect of the present invention, a device management method may include, but is not limited to, controlling a device, controlling a communication between the device and a device controller, managing the device controller and a communication controller, monitoring data transmitted between the device controller and the communication controller, formatting data transmitted between the device controller and the communication controller so as to create formatted data, and supplying the formatted data to a management unit.

The process of monitoring the data may include, but is not limited to, storing first property information of the device controller and second property information of the communication controller, and reporting the first property information when receiving a first query from the communication controller, and reporting the second property information when receiving a second query from the device controller.

The process of monitoring the data may further include, but is not limited to, temporary receiving the data that is to be transmitted between the device controller and the communication controller, and storing the data.

The process of monitoring the data may further include, but is not limited to, performing a selection process of selecting the data to create selected data. The selection process is performed based on information of collecting condition that is used to decide at least one of data sets to be collected and a cycle of the collecting.

The process of performing the selection process may further include, but is not limited to, performing a conversion process of converting the selected data. The conversion process is performed based on information of a reporting format that regulates a format in transmitting the data to the management unit.

A device management program to be executed by a computer to perform a method that may include, but is not limited to, controlling a device, controlling a communication between the device and a device controller, managing the device controller and a communication controller, formatting data transmitted between the device controller and the communication controller so as to create formatted data, and supplying the formatted data to a management unit.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

In the present invention, a monitoring unit is disposed between a device controller and a communication controller. The monitoring unit reports data transmitted between the device controller and the communication controller to the management unit. The monitoring unit can collect operation history of various devices. The monitoring unit converts the data transmitted between the device controller and the communication controller. The monitoring unit can collect operation history of various devices in a uniform format.

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
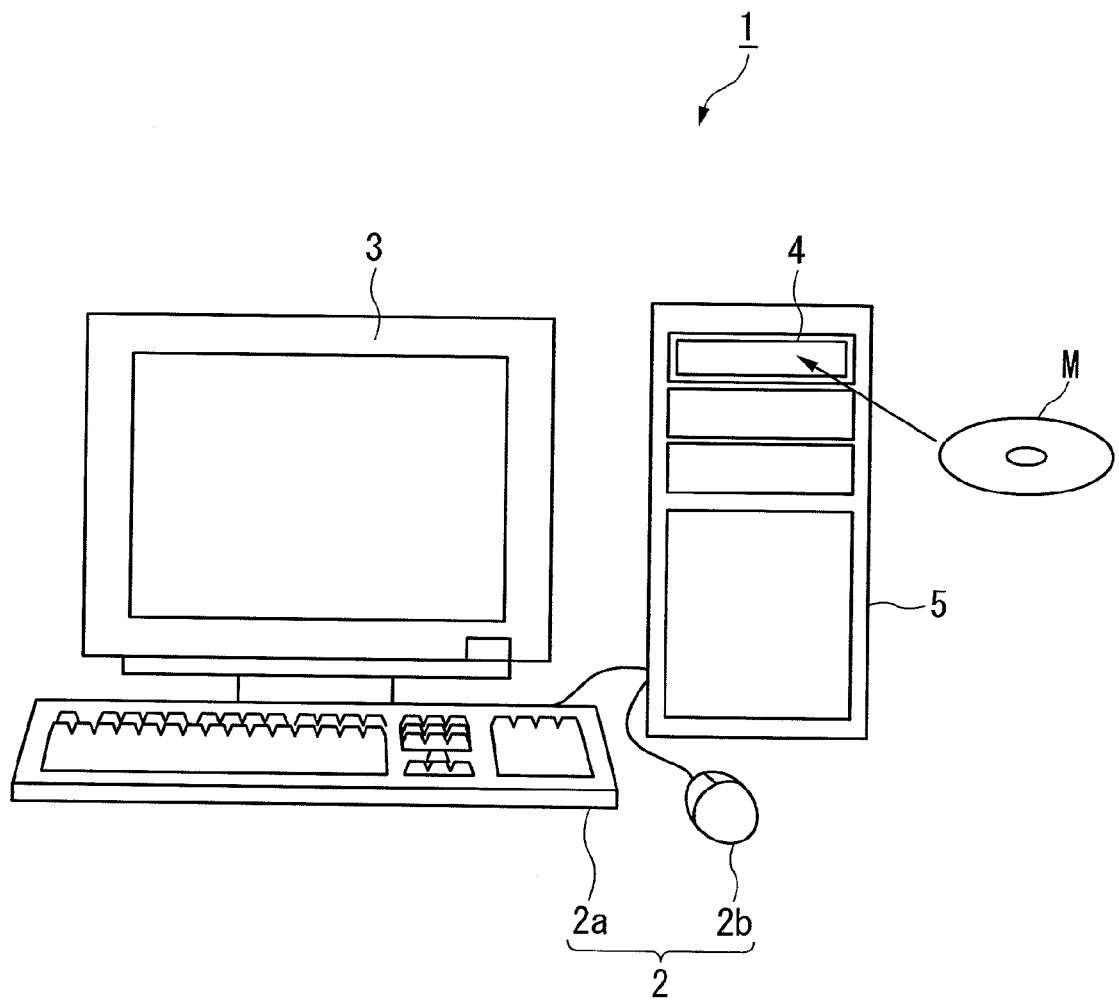
FIG. 1 is an elevation view of a device management apparatus in accordance with a first preferred embodiment of the present invention.

FIG. 1 is an elevation view of a device management apparatus in accordance with a first preferred embodiment of the present invention. The device management apparatus 1 includes an input device 2 such as a keyboard 2a and a mouse 2b, a display device 3 such as a Cathode Ray Tube, hereinafter referred to as a CRT, or a liquid crystal display device, and a main body device 5 including a drive device 4. The device management apparatus 1 performs management of devices 41, 42, 43, - - - of FIG. 2 such as field devices.

The input device 2 is operated by a user of the device management apparatus 1. Operation information of the input device 2 based on the user's operation is output to the main body device 5. The display device 3 displays various information that are output from the main body device 5 such as information showing a state of a device that is managed by the device management apparatus 1. The main body device 5 is connected to a bus B of FIG. 2 such as a field bus, and performs communication, setting, diagnosis, control, etc. of the devices 41, 42, 43, - - - that are objects of management by the main body device 5. The main body device 5 can be connected to the Internet.

The drive device 4 of the main body device 5 is a CD-ROM drive, a DVD-ROM drive, etc., for example. The drive device 4 performs reading of a program or various data that is stored in a storing device M such as a CD-ROM, a DVD-ROM, etc.

Figure 2:
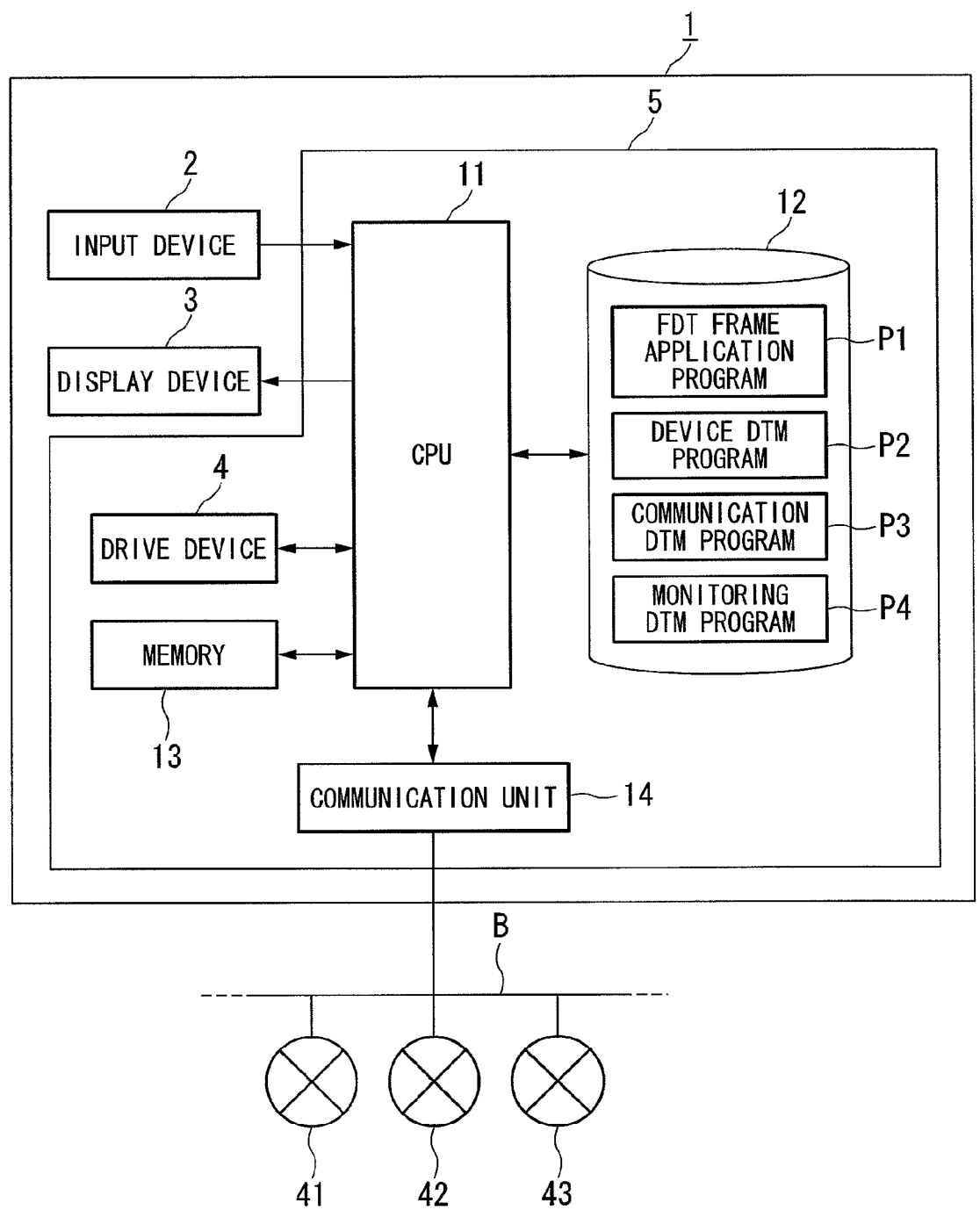
FIG. 2 is a view of a block diagram illustrating a configuration of a hardware of the device management apparatus of FIG. 1.

FIG. 2 is a view of a block diagram illustrating a configuration of a hardware of the device management apparatus in accordance with the first preferred embodiment of the invention. The main body device 5 includes the drive device 4, a central processing unit 11, hereinafter referred to as a CPU 11, a data storing unit 12, a memory 13, and a communication unit 14. The CPU 11 controls the performance of the main body device 5 totally. The CPU 11 loads each of various programs stored in the data storing unit 12 and achieves a respective function of the program based on the instruction by the user.

The data storing unit 12 stores the various programs executed by the device management apparatus 1, various received data from the devices 41, 42, 43, - - - , and various data such as an operation history of the devices 41, 42, 43, - - - . The data storing unit 12 is realized by a hard disk, for example. The data storing unit 12 stores a FDT frame application program P1, a device DTM program P2, a communication DTM program P3, and a monitoring DTM program P4 that are the various programs executed by the device management apparatus 1.

The FDT frame application program P1 is an executable program that is executed by the instruction by the user. The device DTM program P2, the communication DTM program P3, and the monitoring DTM program P4 are programs that are provided as libraries dynamically related to the FDT frame application program P1.

The above mentioned programs are provided being stored in the storing device M of FIG. 1, for example. The programs in the storing device M are read by the drive device 4, and the read programs are stored in the data storing unit 12. That is, the programs are installed. When the programs are provided through the Internet, the installation of the programs is performed after connecting the main device 5 to the Internet and downloading the programs from the Internet. Details of the programs will be described after.

The memory 13 temporarily stores data to be used in a processing performed in the CPU 11. The memory 13 is realized by a semiconductor memory such as a Random Access Memory, hereinafter referred to as a RAM.

The communication unit 14 is connected to the bus B that is connected to the devices 41, 42, 43, - - - . The communication unit 14 performs communication with the devices 41, 42, 43, - - - based on the control by the CPU 11. FIG. 2 illustrates the case that the communication unit 14 is directly connected to the bus B that is connected to the devices 41, 42, 43, - - - . In other case, the communication unit 14 may be connected to a general network such as an Ethernet, and the general network may be connected to the bus B through a relaying device.

Figure 3:
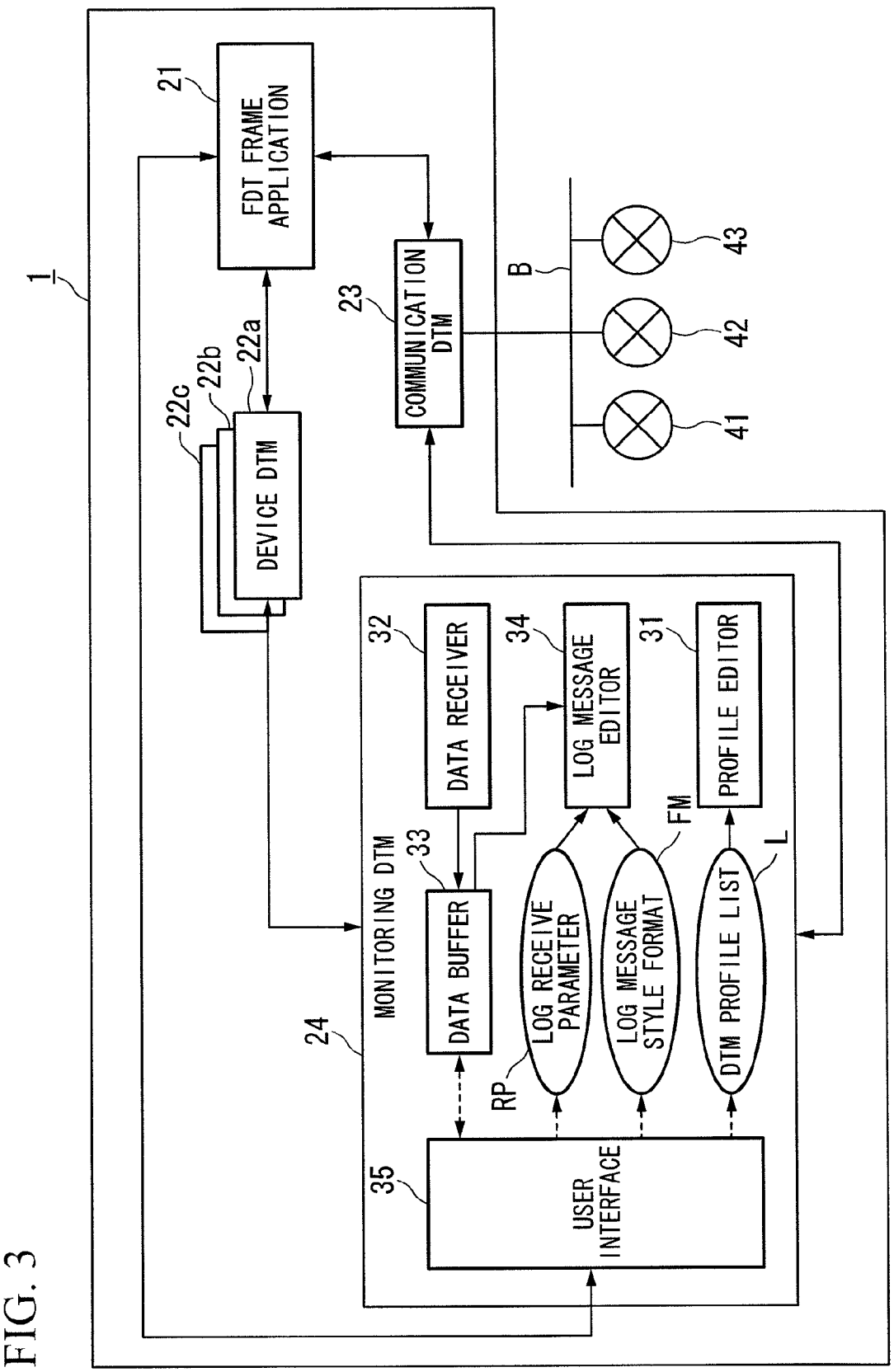
FIG. 3 is a view of a block diagram illustrating a configuration of a software of the device management apparatus of FIG. 1.

Various functions performed by the device management apparatus of the first preferred embodiment when the various programs stored in the data storing unit 12 are loaded by the CPU 11 will be described. FIG. 3 is a view of a block diagram illustrating a configuration of a software of the device management apparatus in accordance with the first preferred embodiment of the invention. The device management apparatus 1 includes a FDT frame application 21, device DTMs 22a, 22b, 22c, - - - , a communication DTM 23, and a monitoring DTM 24. The FDT frame application 21 is a management unit. The device DTMs 22a, 22b, 22c, - - - are device controller. The communication DTM 23 is a communication controller. The monitoring DTM 24 is a monitoring unit. All of the FDT frame application 21, the device DTMs 22a, 22b, 22c, - - - , the communication DTM 23, and the monitoring DTM 24 are designed based on a FDT/DTM technology.

The FDT frame application 21 is realized by the CPU 11 loading the FDT frame application program P1 stored in the data storing unit 12. The FDT frame application 21 links the device DTMs 22a, 22b, 22c, - - - to the communication DTM 23 and the monitoring DTM 24, and controls the device DTM 22a, 22b, 22c, - - - and the communication DTM 23. The FDT frame application 21 provides a user interface that enables the user to perform operations of the device DTMs 22a, 22b, 22c, - - - and the communication DTM 23.

The device DTMs 22a, 22b, 22c, - - - is realized by the CPU 11 loading the device DTM program P2 stored in the data storing unit 12. Each of the device DTMs 22a, 22b, 22c, - - - controls a respective one of the devices 41, 42, 43, - - - , and achieves a respective function of the respective devices 41, 42, 43. Each of the device DTMs 22a, 22b, 22c, - - - provides a user interface that displays parameters concerning the devices 41, 42, 43, - - - in a format that is easy for the user to recognize. The display of the parameters is performed based on information from the communication DTM 23 through the monitoring DTM 24.

The communication DTM 23 is realized by the CPU 11 loading the communication DTM program P3 stored in the data storing unit 12. The communication DTM 23 is disposed between the device DTMs 22a, 22b, 22c, - - - and the devices 41, 42, 43, - - - . The communication DTM 23 performs transmission of various information with the devices 41, 42, 43, - - - through the bus B. The communication DTM 23 controls the bus B directly. The communication DTM 23 receives information of the bus B including information of the devices 41, 42, 43, - - - , and performs formatting of the received information based on the FDT specification. The communication DTM 23 outputs the received information of the devices 41, 42, 43, - - - to the respective device DTMs 22a, 22b, 22c, - - - . The communication DTM 23 receives information of the device DTMs 22a, 22b, 22c, - - - , and performs setting of the respective devices 41, 42, 43, - - - based on the received information.

The monitoring DTM 24 is realized by the CPU 11 loading the monitoring DTM program P4 stored in the data storing unit 12. The monitoring DTM 24 is disposed between the device DTMs 22*a*, 22*b*, 22*c*, - - - and the communication DTM 23. The monitoring DTM 24 performs monitoring of data transmitted between the device DTMs 22*a*, 22*b*, 22*c*, - - - and the communication DTM 23, and collects the data without effecting the communication between the device DTMs 22*a*, 22*b*, 22*c*, - - - and the communication DTM 23. The monitoring DTM 24 performs formatting of the collected data, and outputs the formatted data to the FDT frame application 21.

The monitoring DTM 24 includes a profile editor 31, a data receiver 32, a data buffer 33, a log message editor 34, and a user interface 35. The profile editor 31 is a reporting unit. The data receiver 32 is a receiving unit. The data buffer 33 is a storing unit. The log message editor 34 is a processor.

When each of the device DTMs 22*a*, 22*b*, 22*c*, - - - queries property information of the communication DTM 23, the profile editor 31 receives the query, reads the property information of the communication DTM 23 from a DTM profile list L, performs formatting of the property information, and reporting the property information to the respective device DTMs 22*a*, 22*b*, 22*c*, - - - that queries the property information.

When the communication DTM 23 queries property information of the device DTMs 22*a*, 22*b*, 22*c*, - - - -, the profile editor 31 receives the query, reads the property information of the device DTMs 22*a*, 22*b*, 22*c*, - - - from a DTM profile list L, performs formatting of the property information, and reporting the property information to the communication DTM 23 that queries the property information.

By the above mentioned operation of the profile editor 31, the monitoring DTM 24 acts as the communication DTM 23 to the device DTMs 22*a*, 22*b*, 22*c*, - - -. The monitoring DTM 24 acts as the device DTMs 22*a*, 22*b*, 22*c*, - - - to the communication DTM 23. The monitoring DTM 24 exists between the device DTMs 22*a*, 22*b*, 22*c*, - - - and the communication DTM 23 in this way.

The above-mentioned property information is attribute information of each of the device DTMs 22*a*, 22*b*, 22*c*, - - - or the communication DTM 23. The property information includes version information or information about a compatible communication protocol, for example.

The DTM profile list L is a list of the property information of the device DTMs 22*a*, 22*b*, 22*c*, - - - and the communication DTM 23 that are managed by the FDT frame application 21. The DTM profile list L includes the property information of the device DTMs 22*a*, 22*b*, 22*c*, - - - and the communication DTM 23 that are collected by the FDT frame application 21. The DTM profile list L is stored in the memory 13 or the data storing unit 12, for example.

The data receiver 32 receives data transmitted between the device DTMs 22*a*, 22*b*, 22*c*, - - - and the communication DTM 23, and the data buffer 33 stores the received data. When the received data is stored in the data buffer 33, the data receiver 32 returns the received data as it is to a respective one of the device DTMs 22*a*, 22*b*, 22*c*, - - - and the communication DTM 23 that originally outputs the data. The returned data is not changed, deleted, nor added another data. As a result, the receiving of data by the data receiver 32 is temporary. The data buffer 33 is disposed in the memory 13 or the data storing unit 12, for example.

The log message editor 34 performs a selection process of selecting data that is stored in the data buffer 33 based on a log receive parameter RP. The log receive parameter RP is information of collecting condition that decides one or both of data to be collected by the monitoring DTM 24 and cycle of the collecting by the monitoring DTM 24. The log receive parameter RP is transmitted between the device DTMs 22*a*, 22*b*, 22*c*, - - - and the communication DTM 23. The log receive parameter RP is stored in the memory 13 or the data storing unit 12, for example.

The log message editor 34 performs a conversion process of converting the selected data in a format that is regulated by a log message style format FM. The log message style format FM is information of a reporting format that regulates a format in transmitting various data in the monitoring DTM 24 including the operation history to the FDT frame application 21. The log message style format FM is stored in the memory 13 or the data storing unit 12, for example.

The user interface 35 enables the user of the device management apparatus 1 to create, read, and edit the DTM profile list L, the log receive parameter RP, and the log message style format FM. The user interface 35 enables the user to perform an operation to the data stored in the data buffer 33. The operation is reading or editing of the data, for example.

The operation of the device management apparatus 1 in accordance with the above mentioned configuration will be described. First, an initial operation to realize the software configuration of FIG. 3 will be described. Second, a monitoring operation that the monitoring DTM 24 performs monitoring and collecting of the data transmitted between the device DTMs 22*a*, 22*b*, 22*c*, - - - and the communication DTM 23 and outputs the collected data to the FDT frame application 21 will be described.

[Initial Operation]

Figure 4:
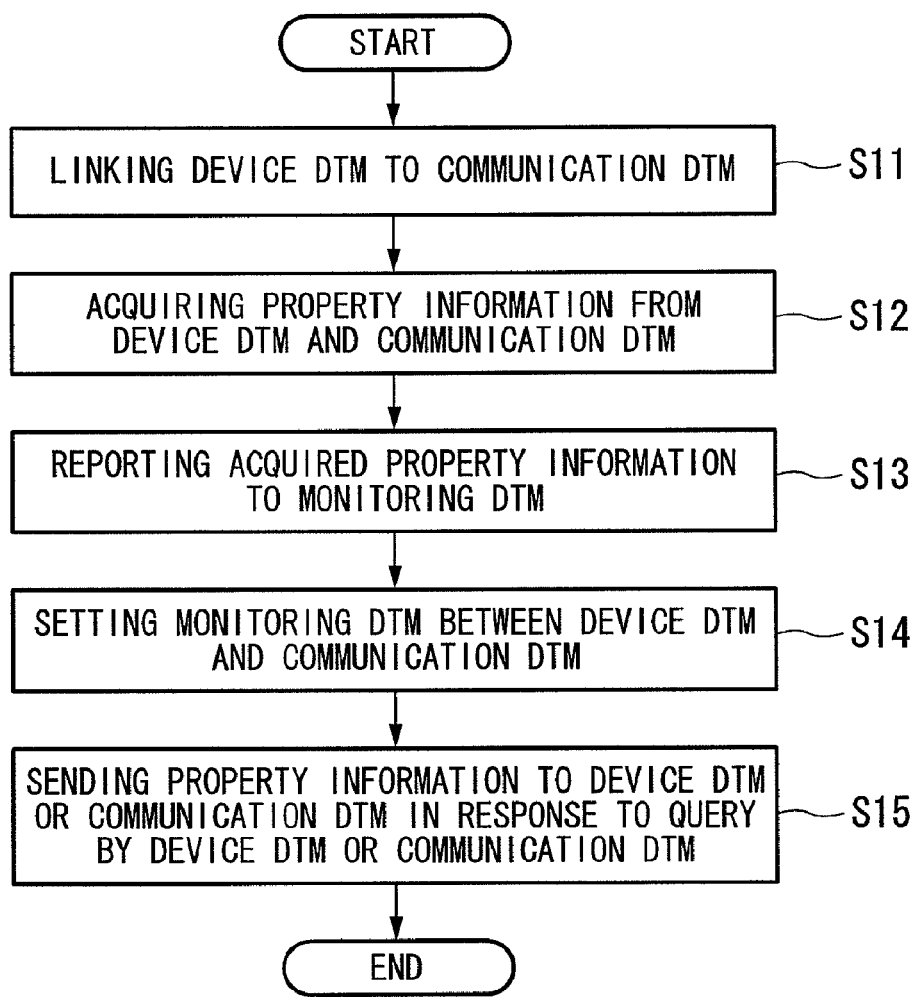
FIG. 4 is a flowchart illustrating an initial operation of the device management apparatus of FIG. 1.

FIG. 4 is a flowchart illustrating the initial operation of the device management apparatus in accordance with the first preferred embodiment. When the user instructs the execution of the FDT frame application program P1 by operating the input device 2 of the device management apparatus 1, the flowchart of FIG. 4 will be started.

After the user's instruction, the CPU 11 of FIG. 2 loads the FDT frame application program P1 from the data storing unit 12 and runs the FDT frame application program P1. Then the CPU 11 loads the device DTM program P2, the communication DTM program P3, and the monitoring DTM program P4 from the data storing unit 12. By the above mentioned procedure, the FDT frame application 21, the device DTMs 22*a*, 22*b*, 22*c*, - - -, and the communication DTM 23 of FIG. 3 are realized.

[Step S11]

Figure 6:
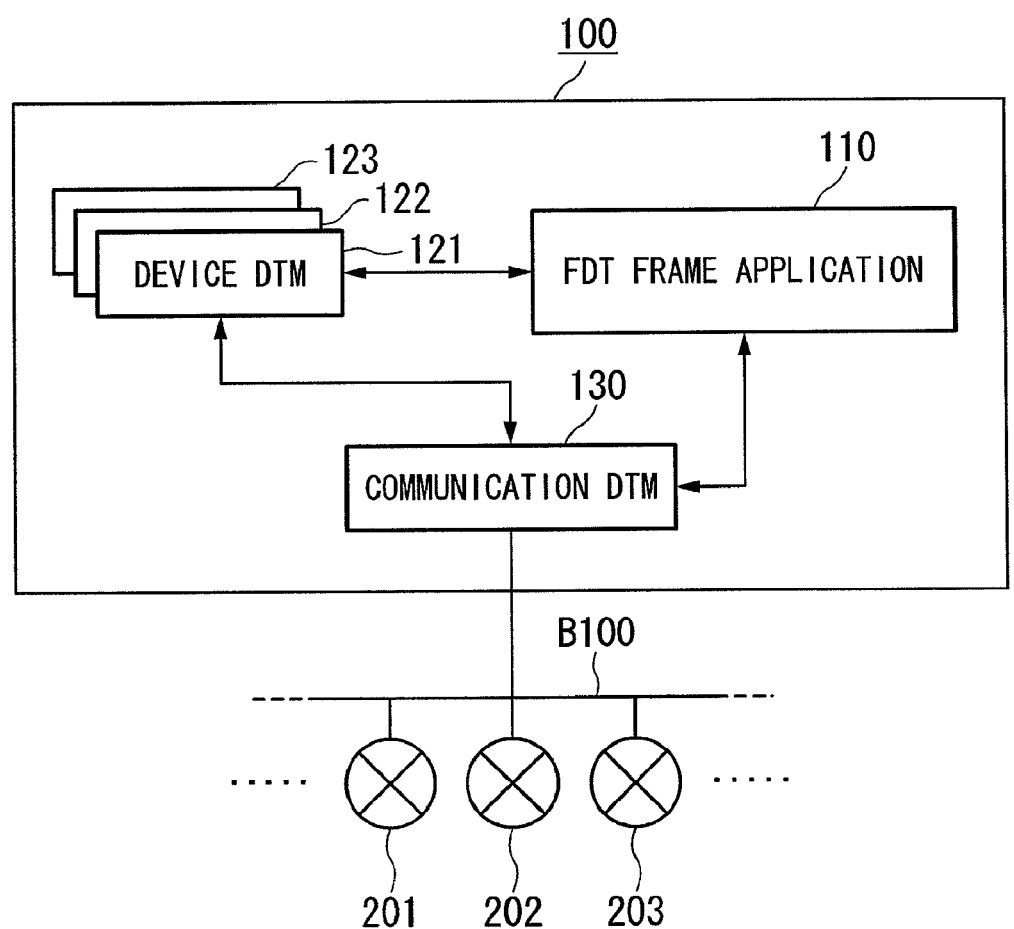
FIG. 6 is a block diagram illustrating a main configuration of a conventional device management apparatus.

The FDT frame application 21 links the device DTMs 22*a*, 22*b*, 22*c*, - - - to the communication DTM 23. The linking of the device DTMs 22*a*, 22*b*, 22*c*, - - - to the communication DTM 23 is same as the linking of the device DTMs 121, 122, 123, - - - to the communication DTM 130 of FIG. 6.

[Step S12]

The FDT frame application 21 receives the property information of each of the device DTMs 22*a*, 22*b*, 22*c*, - - - and the communication DTM 23.

[Step S13]

The FDT frame application 21 transmits the received property information of each of the device DTMs 22*a*, 22*b*, 22*c*, - - - and the communication DTM 23 to the monitoring DTM 24. The monitoring DTM 24 creates the DTM profile list L. The DTM profile list L is stored in the memory 13 or the data storing unit 12 of the monitoring DTM 24.

[Step S14]

The FDT frame application 21 disposes the monitoring DTM 24 between the device DTMs 22*a*, 22*b*, 22*c*, - - - and the communication DTM 23 without changing the linking of the device DTMs 22a, 22b, 22c, - - - to the communication DTM 23.

[Step S15]

After the above mentioned disposing have finished, when one of the device DTMs 22a, 22b, 22c, - - - queries the property information of the communication DTM 23, the profile editor 31 of the monitoring DTM 24 reads the property information of the communication DTM 23 from the DTM profile list L, performs formatting of the property information, and reports the formatted property information to the respective device DTMs 22a, 22b, 22c, - - - that queries the property information of the communication DTM 23. When the communication DTM 23 queries the property information of one of the device DTMs 22a, 22b, 22c, - - - , the profile editor 31 of the monitoring DTM 24 reads the property information of the respective one of the device DTMs 22a, 22b, 22c, - - - from the DTM profile list L, performs formatting of the property information, and reports the formatted property information to the communication DTM 23.

As a result, the monitoring DTM 24 acts as the communication DTM 23 to the device DTMs 22a, 22b, 22c, - - - , and the monitoring DTM 24 acts as the device DTMs 22a, 22b, 22c, - - - to the communication DTM 23.

[Monitoring Operation]

Figure 5:
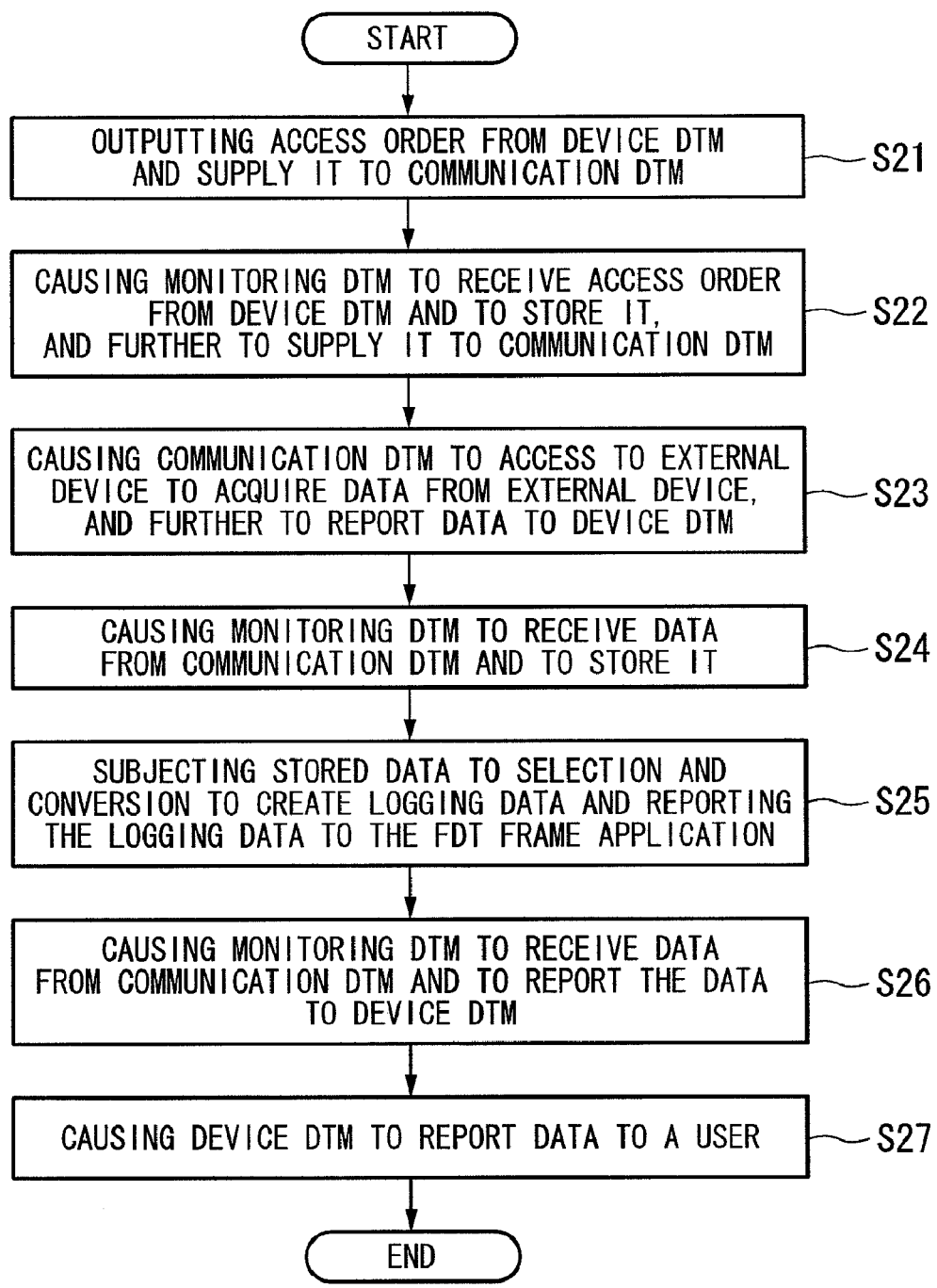
FIG. 5 is a flowchart illustrating a monitoring operation of the device management apparatus of FIG. 1.

FIG. 5 is a flowchart illustrating the monitoring operation of the device management apparatus 1 in accordance with the first preferred embodiment of the present invention. The flowchart illustrates the operation of the device DTMs 22a, 22b, 22c, - - - in collecting parameters of the devices 41, 42, 43, - - - . The flowchart starts after the initial operation have finished. The operation of the device DTM 22a in collecting the parameter of the device 41 will be described below.

[Step S21]

When collecting parameters of the device 41, the device DTM 22a outputs an access order for the communication DTM 23 to accesses the parameter of the device 41, and supplies the access order to the communication DTM 23.

[Step S22]

The data receiver 32 of the monitoring DTM 24 receives the access order output from the device DTM 22a. The data buffer 33 stores the received access order. Then the profile editor 31 supplies the access order to the communication DTM 23 that the access order is originally supplied to.

[Step S23]

The communication DTM 23 receives the access order output from the monitoring DTM 24. Then the communication DTM 23 accesses the device 41 based on the received access order, and reads the parameter of the device 41. The communication DTM 23 reports data of the parameter of the device 41 to the device DTM 22a that outputs the access order.

[Step S24]

The data receiver 32 of the monitoring DTM 24 receives the data of the parameter of the device 41 before the data is reported to the device DTM 22a, and the data buffer 33 stores the data. The log message editor 34 of the monitoring DTM 24 performs the selection process to the data stored in the data buffer 33, and the data is narrowed down.

[Step S25]

After the selection process, the log message editor 34 formats the data based on the log message style format FM, and creates logging data. By the selection process and the conversion process, the logging data is created in a uniform format. The monitoring DTM 24 reports the created logging data to the FDT frame application 21.

[Step S26]

After the reporting of the logging data to the FDT frame application 21, the monitoring DTM 24 reports the data that the data receiver 32 received in the process of Step S24 to the device DTM 22a that the data is originally reported to. The data is data that is transmitted from the communication DTM 23 to the device DTM 22a.

[Step S27]

After receiving the data from the communication DTM 23, the device DTM 22a performs a process of displaying the data on the display device 3. The display device 3 displays the parameter of the device 41 in a format that is easy for the user to recognize.

As described above, in the first preferred embodiments, the monitoring DTM 24 exists between the device DTMs 22a, 22b, 22c, - - - and the communication DTM 23. The monitoring DTM 24 receives the data transmitted between the device DTMs 22a, 22b, 22c, - - - and the communication DTM 23. The monitoring DTM 24 performs the selection process and the conversion process to create the logging data in the uniform format. The monitoring DTM 24 reports the logging data to the FDT frame application 21. In this way, the FDT frame application 21 can collect the operation history of the devices 41, 42, 43, - - - in the uniform format.

While the device management apparatus and the program of the preferred embodiments of the invention have been described and illustrated above, it should be understood that these are exemplary of the invention and are not to be considered as limiting. Additions, omissions, substitutions, and other modifications can be made without departing from the spirit or scope of the present invention. For example, in the above description of the preferred embodiments, the monitoring DTM 24 receives the data from the communication DTM 23, and reports the received data to the device DTM 22a that the data is originally reported to after creating the logging data and reporting the logging data to the FDT frame application 21. This process is illustrated in Step S24, S25 and S26 of FIG. 5. This process is to prevent delay of process performed in the monitoring DTM. If there is no effect of the delay, the monitoring DTM 24 can report the received data to the device DTM 22a before creating the logging data and reporting the logging data to the FDT frame application 21.

The format of the logging data that is reported to the FDT frame application 21 is the log message style format FM and can be an arbitrary format. When the format is a saving format of an application used in a personal computer such as a word processor software and a spreadsheet software, the management of the operation history can be easy. In the conventional art, the FDT application cannot figure out the data transmission between the device DTM and the communication DTM, for the device DTM and the communication DTM are made by the various makers. In the present invention, the monitoring DTM can perform monitoring of the data transmission between the device DTM and the communication DTM. As a result, the monitoring DTM can be used as a debug tool.

In the conventional art, when a fault occurs, it may be difficult to figure out the cause of the fault. The cause may be in the FDT frame application, in the device DTM or in the communication DTM. In the present invention, the monitoring DTM exists between the device DTM and the communication DTM, and is connected to the interface of the FDT frame application. As a result, the monitoring DTM can be used for analyzing the data flow between the device DTM, the communication DTM, and the FDT frame application.

In the preferred embodiments described above, the monitoring DTM receives the access order from the device DTM and the data from the communication DTM, and supplies the received data to the communication DTM or the device DTM without changing, deleting, adding another data, etc. But the monitoring DTM can perform an operation such as suppressing, non-reporting, etc. to the data transmitted between the monitoring DTM and the device DTM. By performing the operation, unnecessary operation to the devices can be suppressed, and divulging of information can be prevented. As a result, security can be increased.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A device management apparatus comprising:
a device DTM that controls a field device;
a communication DTM that controls a communication between the field device and the device DTM;
a FDT frame application that manages the device DTM and the communication DTM; and
a monitoring DTM that performs monitoring and collecting of data transmitted between the device DTM and the communication DTM and outputs the data to the FDT frame application, the monitoring DTM collecting first property information of the communication DTM and second property information of the device DTM, the monitoring DTM storing the first and second property information in a DTM profile list, and
wherein the monitoring DTM comprises:
a data receiver that receives the first property information of the communication DTM and the second property information of the device DTM that the FDT frame application links to the communication DTM;
a data buffer that stores the first property information and the second property information that has been received by the data receiver; and
a profile editor that reports the first property information of the communication DTM in the DTM profile list to the device DTM when the device DTM queries the first property information, the profile editor reporting the second property information of the device DTM in the DTM profile list to the communication DTM when the communication DTM queries the second property information, wherein
the monitoring DTM is disposed between the device DTM and the communication DTM,
the monitoring DTM collects the data transmitted between the device DTM and the communication DTM without effecting communication between the device DTM and the communication DTM,
the monitoring DTM performs formatting of the data that has been collected by the monitoring DTM, and outputs the data, which has been formatted, to the FDT frame application.

2. A device management method comprising:
controlling a field device;
controlling a communication between the field device and a device DTM;
managing the device DTM and a communication DTM;
monitoring and collecting of data transmitted between the device DTM and the communication DTM to output the data to a FDT frame application;
collecting first property information of the communication DTM and second property information of the device DTM;
storing the first and second property information in a DTM profile list;
receiving the first property information of the communication DTM and the second property information of the device DTM that links to the communication DTM;
reporting the first property information of the communication DTM in the DTM profile list to the device DTM when the device DTM queries the first property information;
reporting the second property information of the device DTM in the DTM profile list to the communication DTM when the communication DTM queries the second property information;
collecting the data transmitted between the device DTM and the communication DTM without effecting communication between the device DTM and the communication DTM, and
performing formatting of the data that has been collected, and outputting the data, which has been formatted, to the FDT frame application.

* * * * *